(12) United States Patent
Tamura

(10) Patent No.: US 9,224,321 B2
(45) Date of Patent: Dec. 29, 2015

(54) PROJECTOR FOR PERFORMING TRAPEZOIDAL DISTORTION CORRECTION AND METHOD OF CONTROLLING PROJECTOR

(75) Inventor: Akihiko Tamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 468 days.

(21) Appl. No.: 13/547,163

(22) Filed: Jul. 12, 2012

(65) Prior Publication Data

US 2013/0021585 A1   Jan. 24, 2013

(30) Foreign Application Priority Data

Jul. 21, 2011   (JP) ................................. 2011-159628

(51) Int. Cl.
  *H04N 9/31*   (2006.01)
  *G09G 3/00*   (2006.01)
  *G09G 5/00*   (2006.01)
  *H04N 21/431*   (2011.01)
  *H04N 21/485*   (2011.01)

(52) U.S. Cl.
  CPC .................. *G09G 3/002* (2013.01); *G09G 5/00* (2013.01); *H04N 9/3185* (2013.01); *G09G 2320/0693* (2013.01); *G09G 2320/08* (2013.01); *H04N 9/3194* (2013.01); *H04N 9/3197* (2013.01); *H04N 21/431* (2013.01); *H04N 21/485* (2013.01)

(58) Field of Classification Search
  CPC . H04N 9/3185; H04N 9/3197; H04N 9/3194; H04N 21/485; H04N 21/431
  USPC ....................................................... 353/69, 70
  See application file for complete search history.

(56) References Cited

U.S. PATENT DOCUMENTS

| | | | | |
|---|---|---|---|---|
| 6,540,365 B1* | 4/2003 | Fujiwara | ................ | G09G 3/002 345/619 |
| 6,592,228 B1* | 7/2003 | Kawashima | ........... | G03B 21/00 348/745 |
| 6,652,104 B2* | 11/2003 | Nishida | ................. | G03B 21/14 353/119 |
| 6,843,569 B2* | 1/2005 | Hirao | ................. | H04N 5/44504 348/E5.1 |
| 6,876,397 B2* | 4/2005 | Funakoshi | ......... | H04N 5/44504 345/472.2 |
| 7,093,940 B2* | 8/2006 | Kubo | ................... | H04N 9/3185 345/647 |
| 7,290,889 B2* | 11/2007 | Ullmann | ................. | H04N 5/74 348/E5.137 |
| 7,370,980 B2* | 5/2008 | Hirao | ..................... | G03B 21/14 348/745 |

(Continued)

FOREIGN PATENT DOCUMENTS

| | | |
|---|---|---|
| JP | 2006-14233 A | 1/2006 |
| JP | 2008-244981 A | 10/2008 |

(Continued)

*Primary Examiner* — Bao-Luan Le
(74) *Attorney, Agent, or Firm* — ALG Intellectual Property, LLC

(57) ABSTRACT

A projector includes a deformation ratio calculating unit that calculates a first deformation ratio on a reference point set in a first image when performing a correction process with respect to a first image data, a deformation ratio determination unit that determines a second deformation ratio of the first image based on the first deformation ratio calculated by the deformation ratio calculation unit, a synthesis image generation unit that generates synthesis image data indicating a synthesis image which is generated by synthesizing a second image indicated by second image data and the first image with a size changed based on the second deformation ratio, a correction unit that performs a correction process with respect to the synthesis image data, and a projection unit that projects the synthesis image based on the synthesis image data which is subjected to the correction process.

8 Claims, 9 Drawing Sheets

(56) References Cited

U.S. PATENT DOCUMENTS

| | | | |
|---|---|---|---|
| 7,384,157 B2* | 6/2008 | Muraoka | G03B 21/14 348/E17.005 |
| 8,159,760 B2* | 4/2012 | Kubota | 359/697 |
| 8,162,487 B2* | 4/2012 | Ofune | H04N 5/44513 353/69 |
| 8,382,290 B2* | 2/2013 | Takahashi | G03B 21/14 353/57 |
| 8,451,381 B2* | 5/2013 | Kaise | H04N 5/44513 348/580 |
| 8,480,237 B2* | 7/2013 | Tamura | G03B 21/00 348/746 |
| 8,523,366 B2* | 9/2013 | Takahashi | H04N 9/3182 348/177 |
| 8,577,178 B2* | 11/2013 | Tamura | H04N 9/3185 348/580 |
| 8,587,731 B2* | 11/2013 | Takahashi | G03B 21/00 348/468 |
| 9,098,195 B2* | 8/2015 | Uchida | G06F 3/0425 1/1 |
| 2002/0060749 A1* | 5/2002 | Funakoshi | H04N 5/44504 348/569 |
| 2002/0060754 A1* | 5/2002 | Takeuchi | H04N 5/74 348/745 |
| 2002/0122161 A1* | 9/2002 | Nishida | G03B 21/14 353/70 |
| 2003/0095239 A1* | 5/2003 | Hirao | H04N 5/44504 353/69 |
| 2005/0024597 A1* | 2/2005 | Kubo | H04N 9/3185 353/69 |
| 2006/0119799 A1* | 6/2006 | Ullmann | H04N 5/74 353/69 |
| 2006/0197920 A1* | 9/2006 | Furui | G03B 21/00 353/69 |
| 2008/0238939 A1 | 10/2008 | Tamura | |
| 2009/0207323 A1* | 8/2009 | Tamura | G03B 21/00 348/745 |
| 2009/0225235 A1* | 9/2009 | Fujisaki | H04N 7/0122 348/745 |
| 2009/0238490 A1 | 9/2009 | Tamura | |
| 2009/0278999 A1* | 11/2009 | Ofune | H04N 5/44513 348/745 |
| 2010/0021080 A1* | 1/2010 | Tamura | H04N 9/3185 382/275 |
| 2010/0053438 A1 | 3/2010 | Kumamoto | |
| 2010/0165168 A1* | 7/2010 | Takahashi | H04N 9/3182 348/333.1 |
| 2010/0253862 A1* | 10/2010 | Takahashi | G03B 21/00 348/745 |
| 2010/0302466 A1* | 12/2010 | Kubota | G02B 7/102 348/745 |
| 2011/0025982 A1* | 2/2011 | Takahashi | G03B 21/14 353/15 |
| 2011/0069234 A1* | 3/2011 | Kaise | H04N 5/44513 348/607 |
| 2011/0069235 A1* | 3/2011 | Fujisaki | H04N 9/3185 348/624 |
| 2011/0107222 A1* | 5/2011 | Uchida | G06F 3/0425 715/730 |
| 2011/0157563 A1* | 6/2011 | Funada | G03B 5/02 353/70 |
| 2012/0257173 A1 | 10/2012 | Murayama | |

FOREIGN PATENT DOCUMENTS

| | | |
|---|---|---|
| JP | 2010-26870 | 2/2010 |
| JP | 2010-054550 A | 3/2010 |
| JP | 2012-222517 A | 11/2012 |

* cited by examiner

PROJECTOR FOR PERFORMING TRAPEZOIDAL DISTORTION CORRECTION AND METHOD OF CONTROLLING PROJECTOR

The entire disclosure of Japanese Patent Application No. 2011-159628, filed Jul. 21, 2011 is expressly incorporated by reference herein.

BACKGROUND

1. Technical Field

The present invention relates to a projector and a method of controlling a projector.

2. Related Art

When a projector is installed to be inclined in the horizontal direction or the vertical direction with respect to a screen, a distortion (trapezoidal distortion) is generated on an image which is projected on the screen. In the projector, a technique has been known wherein the trapezoidal distortion of the image displayed on the screen is corrected by displaying an image having an inverse trapezoidal distortion to the trapezoidal distortion of the image projected on the screen by a light valve such as a liquid crystal panel. JP-A-2006-14233 discloses a trapezoidal distortion correcting apparatus that displays an OSD (On Screen Display) image on a position of a projection screen of a little correction in the trapezoidal distortion correction screen when a projector displays the OSD image on the screen by superimposing on the projection screen.

In the trapezoidal distortion correcting apparatus disclosed in JP-A-2006-14233, if the position of the projection screen of the least correction in the trapezoidal distortion correction changes, the position displaying the OSD image also changes. Further, since the OSD images are superimposed after the correcting of the trapezoidal distortion of the projection screen, the trapezoidal distortion on the OSD image is not corrected and the OSD image is projected with the distortion.

SUMMARY

An advantage of some aspects of the invention is to provide a technique for improving a visibility of an image displayed by being superimposed on a given image when performing a correction process with respect to image data.

An aspect of the invention is directed to a projector including: a deformation ratio calculating unit that calculates a first deformation ratio on a reference point set in a first image when performing a correction process with respect to a first image data indicating the first image; a deformation ratio determination unit that determines a second deformation ratio of the first image based on the first deformation ratio calculated by the deformation ratio calculation unit; a synthesis image generation unit that generates synthesis image data indicating a synthesis image which is generated by synthesizing a second image indicated by second image data and the first image with a size changed based on the determined second deformation ratio; a correction unit that performs a correction process with respect to the generated synthesis image data; and a projection unit that projects the synthesis image based on the synthesis image data which is subjected to the correction process. According to the projector, when the correction process is performed with respect to the image data, the visibility of the first image displayed by being superimposed on the second image is improved as compared to a case in which the second deformation ratio is constant irrespective of the first deformation ratio.

According to the projector, when the correction process including a coordinate transform process is performed with respect to the image data, the visibility of the first image displayed by being superimposed on the second image can be improved.

According to the projector, the visibility of the first image displayed by being superimposed on the second image can be improved as compared to a case of a single reference point.

According to the projector, in a case of the plurality of first images, the visibility of the first images can be improved in accordance with each of the first images.

According to the projector, when the correction process is performed with respect to the image data, the visibility of an OSD image displayed by being superimposed on the second image can be improved as compared to a case in which the second deformation ratio is constant irrespective of the first deformation ratio.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
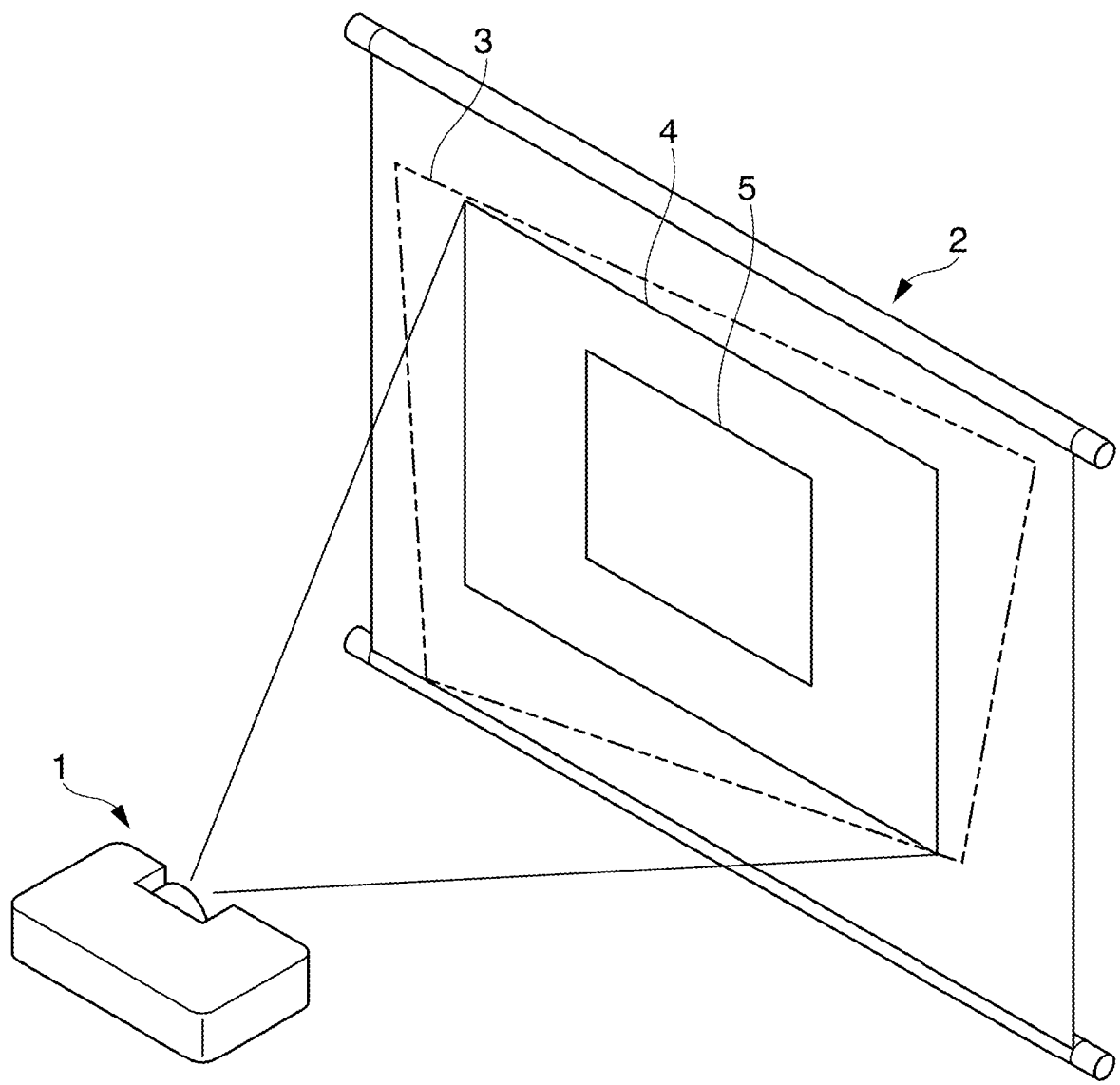
FIG. 1 is an explanatory view of a brief operation of a projector.

FIG. 1 is an explanatory view showing a brief operation of a projector 1 according to an embodiment of the invention. The projector 1 is an apparatus which projects an image (hereinafter, referred to as a "main image (example of a second image)") in accordance with the input video signal on a screen. A screen 2 is a flat surface which reflects the image projected from the projector 1. When a projection axis of the projector 1 is inclined with respect to the screen 2 from an ideal state, an image 3 reflected on the screen 2 becomes distorted. Hereinafter, the distortion is referred to as a "trapezoidal distortion". The projector 1 has a function of correcting the trapezoidal distortion and projecting the corrected image 4. A process of correcting the trapezoidal distortion is referred to as a "trapezoidal distortion correction" (an example of the correction process). The projector 1 has a function of adjusting parameters such as brightness, a position and the trapezoidal distortion correction of the image. A user interface used in the adjusting of these parameters is provided by an OSD image 5 (an example of the first image) projected on the screen 2. The OSD image is displayed by being superimposed on the main image. The trapezoidal distortion correction is performed with respect to a synthesis image in which the OSD image 5 is superimposed on the main image.

Figure 2:
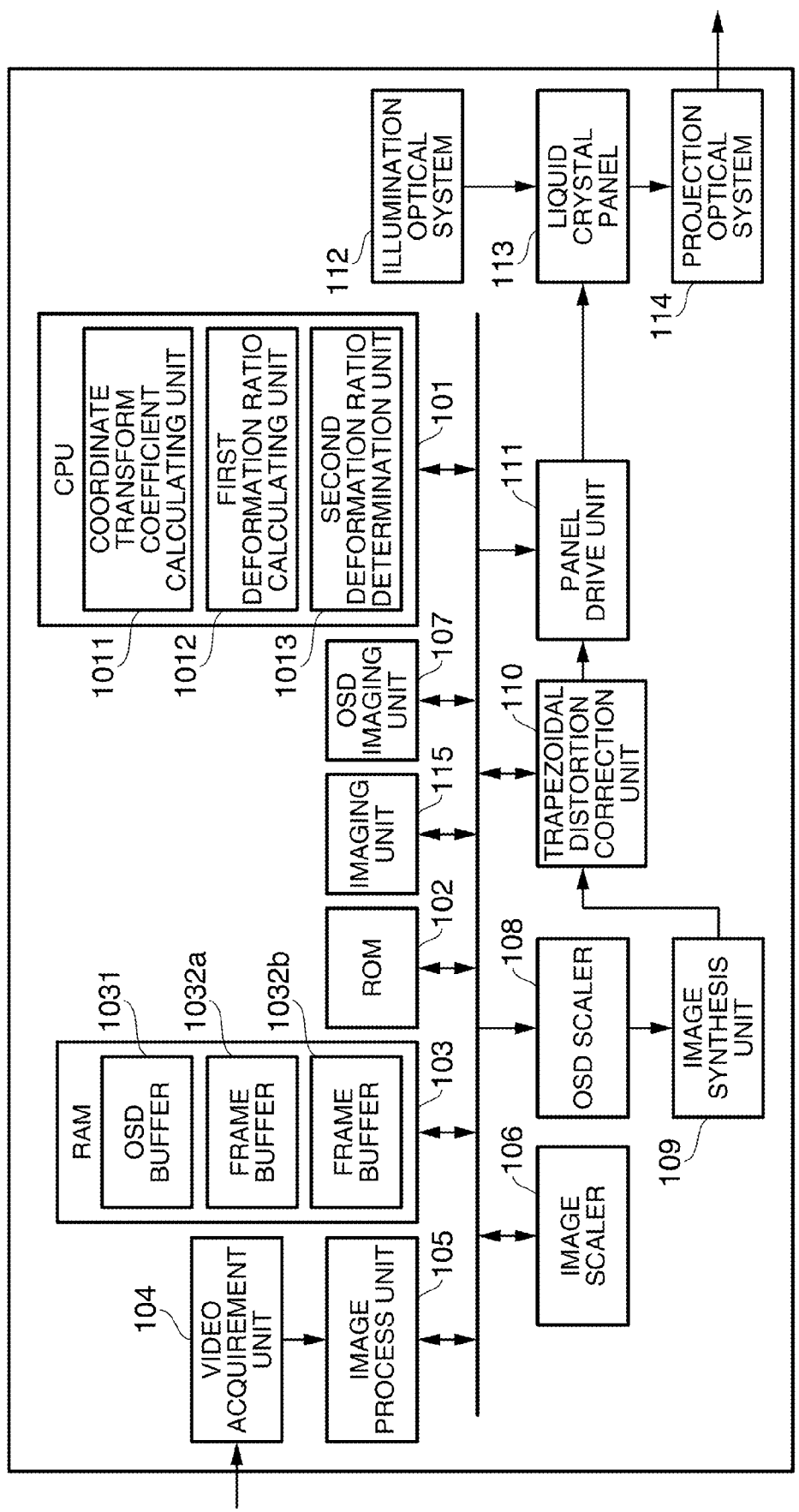
FIG. 2 is a block diagram of an internal configuration of a projector.

FIG. 2 is a block diagram of an internal configuration of the projector 1. The projector 1 includes a CPU (Central Processing Unit) 101, ROM (Read Only Memory) 102, RAM (Random Access Memory) 103, a video acquirement unit 104, an image process unit 105, an image scaler 106, an OSD imaging unit 107, an OSD scaler 108, an image synthesis unit 109, a trapezoidal distortion correction unit 110, a panel drive unit 111, an illumination optical system 112, a liquid crystal panel 113, and a projection optical system 114. The CPU 101 is a control apparatus which controls each part of the projector 1 by executing a program. The CPU 101 includes, as a functional component, a coordinate transform coefficient calculating unit 1011 (an example of a transform coefficient acquirement unit), a first deformation ratio calculating unit 1012 (an example of a deformation ratio calculating unit), and a second deformation ratio determination unit 1013 (an example of a deformation ratio determination unit). The first deformation ratio calculating unit 1012 calculates an OSD deformation ratio (an example of the first deformation ratio) of the reference points set in the OSD image when the trapezoidal distortion correction is performed with respect to OSD data (an example of first image data). The deformation ratio refers to a ratio of a distance between two points before and after a given process. The second deformation ratio determination unit 1013 determines an OSD enlargement ratio (an example of the second deformation ratio) based on the OSD deformation ratio calculated by the first deformation ratio calculating unit 1012. ROM 102 (an example of a memory unit) is a non-volatile memory apparatus storing a variety of programs and data. In this example, ROM 102 stores data for determining the OSD data and the OSD enlargement ratio described above. RAM 103 is a volatile memory apparatus storing data. In this example, RAM 103 includes an OSD buffer 1031, a frame buffer 1032*a*, and a frame buffer 1032*b*. The OSD buffer 1031 is a region in which the data indicating the displayed OSD image is stored. The frame buffer 1032*a* is a region in which an image for one frame among videos indicated by video signals is stored. The frame buffer 1032*b* is a region in which the synthesis image is stored. Here, the frame buffer 1032*a* and the frame buffer 1032*b* are described separately for the explanation, however, a single frame buffer may have a function of both the frame buffer 1032*a* and the frame buffer 1032*b*.

The video acquirement unit 104 acquires a video signal from an external apparatus such as DVD (digital versatile disc) player or a personal computer. The video acquirement unit 104 extracts a vertical and horizontal synchronization signal from the acquired video signals. The image process unit 105 performs image processing on an image indicated by the video signal. The image process unit 105 writes data indicating an image which is subjected to the image process, in the frame buffer 1032*a* as main image data (an example of second image data) for each frame. The image scaler 106 reads out the main image data stored in the frame buffer 1032*a* and performs enlarging process in size with respect to the main image (if the enlargement ratio is smaller than 1, the main image is contracted). In a case of receiving an OSD imaging command from the CPU 101, the OSD imaging unit 107 reads out the OSD data stored in the ROM 102 and writes the read data in the OSD buffer 1031. The OSD scaler 108 reads out the OSD data stored in the OSD buffer 1031, and performs the enlarging process in size with respect to the OSD image. The enlargement ratio in the enlarging process (hereinafter, referred to as an "OSD enlargement ratio") is determined by the CPU 101. The OSD scaler 108 performs the enlarging process of the OSD image with the OSD enlargement ratio determined by the second deformation ratio determination unit 1013. The image synthesis unit 109 (an example of a synthesis image generation unit) generates synthesis image data indicating the synthesis image which is generated by synthesizing the main image enlarged by the image scaler 106 and the OSD image enlarged by the OSD scaler 108. The trapezoidal distortion correction unit 110 (an example of a correction unit) performs the trapezoidal distortion correction with respect to the synthesis image data. The trapezoidal distortion correction unit 110 uses a coordinate transform coefficient as a parameter when correcting the trapezoidal distortion. The coordinate transform coefficient is calculated by the CPU 101. The trapezoidal distortion correction unit 110 writes the synthesis image data which is subjected to the trapezoidal distortion correction in the frame buffer 1032*b*. The panel drive unit 111 reads out the data stored in the frame buffer 1032*b* at a time indicated by the synchronization signal, and drives the liquid crystal panel 113 in accordance with the read data. The illumination optical system 112 includes a lamp such as a high-pressure mercury lamp or an extra high pressure mercury lamp, or other light emitter, and emits light to the liquid crystal panel 113. The liquid crystal panel 113 is a transmissive liquid crystal panel in which a plurality of pixels are arranged in a matrix. The liquid crystal panel 113 is a light valve changing transmittance of the light in each pixel and modulates illumination light emitted from the illumination optical system 112 to an effective image light indicating the image. The liquid crystal panel 113 has XGA resolution (eXtended Graphics Array) and has a display region configured by 1024×768 pixels. The projection optical system 114 includes a lens by which the light modulated to the image light by the liquid crystal panel 113 is enlarged and projected. The illumination optical system 112, the liquid crystal panel 113, and the projection optical system 114 are examples of a projection unit that projects the synthesis image based on the synthesis image data which is subjected to the trapezoidal distortion correction to the screen 2. An imaging unit 115 is a camera imaging the image 3 projected to the screen 2 to calculate the coordinate transform coefficient.

Figure 3:
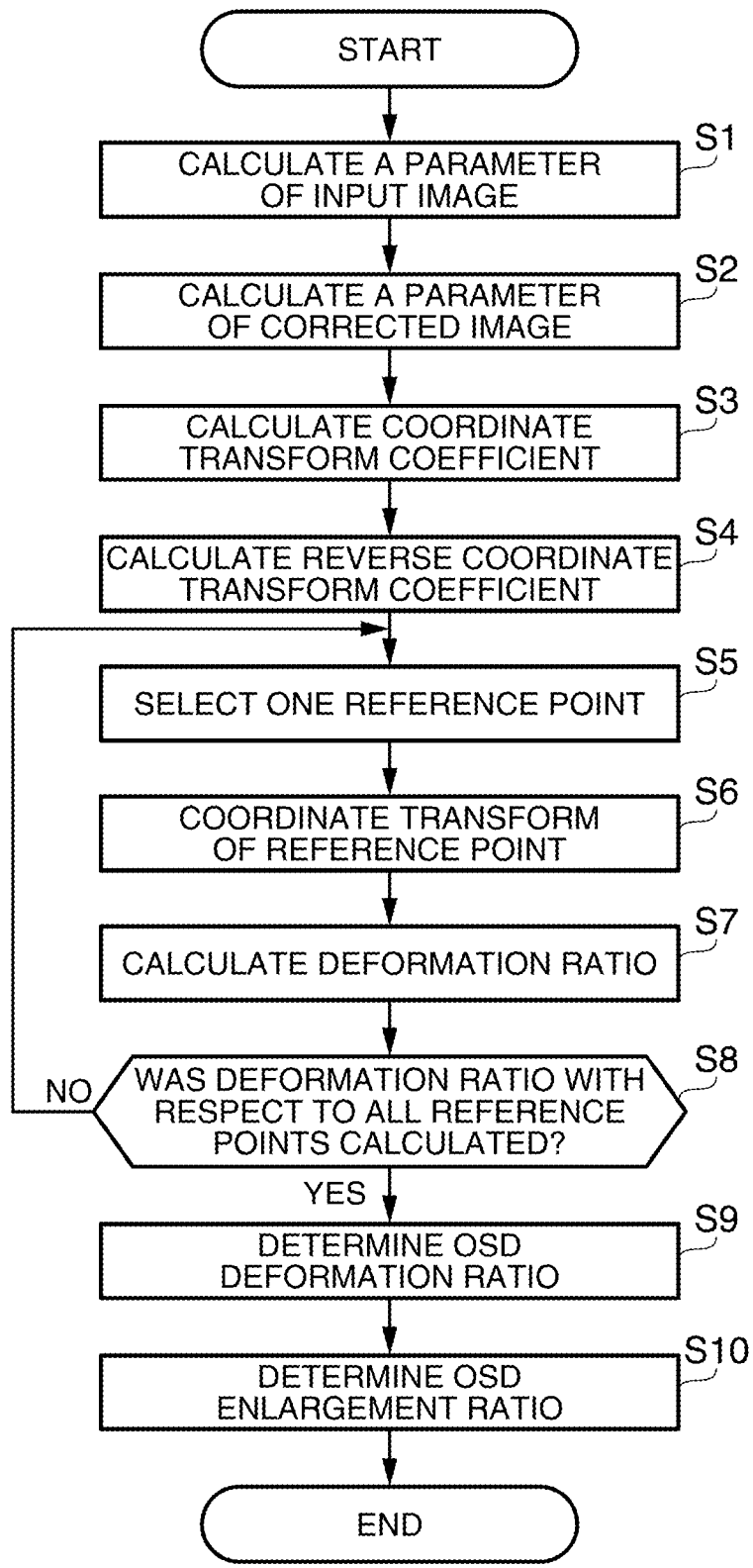
FIG. 3 is a flow chart showing a determination process of an OSD enlargement ratio.

FIG. 3 is a flow chart showing a determination process of an OSD enlargement ratio of the projector 1. The process hereinafter, for example, starts when the power is supplied to the projector 1. In Step S1, the CPU 101 calculates a parameter indicating the size of the main image. In Step S2, the CPU 101 calculates a parameter indicating the shift of the projection axis of the projector 1 from the ideal state, more specifically, a parameter indicating the shape of the image after the correction.

Figure 4A:
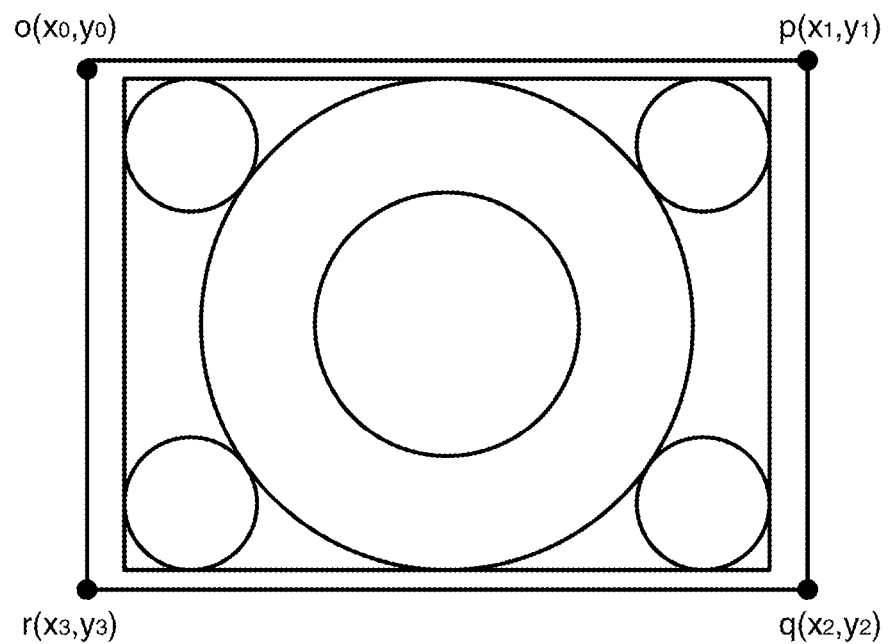
FIGS. 4A and 4B are diagrams showing a parameter.
Figure 4B:
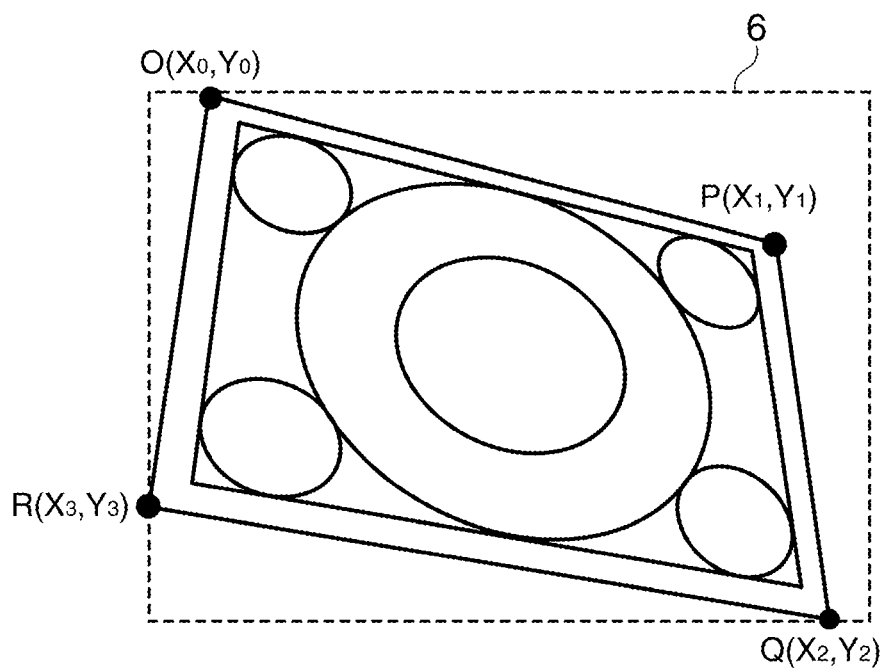

FIGS. 4A and 4B are diagrams showing a parameter acquired in Steps S1 and S2. FIG. 4A shows a parameter indicating the size of the main image and FIG. 4B shows a parameter indicating the size of the image after correction. A dashed line 6 in the FIG. 4B represents the size of the display region. Coordinates of point o (x0, y0), point p (x1, y1), point q (x2, y2), and point r (x3, y3) which are four apexes of the main image are used as a parameter indicating the size of the main image. The coordinates of these points are determined in advance in accordance with the size of the display region (resolution of the liquid crystal panel 113). The data indicating these coordinates are stored in the ROM 102. In Step S1, the CPU 101 acquires the parameter indicating the size of the main image by reading out the data indicating the coordinates from the ROM 102.

Coordinates of point O (X0, Y0), point P (X1, Y1), point Q (X2, Y2), and point R (X3, Y3) which are four apexes of the image after the correction are used as a parameter indicating the shape of the image after the correction. In this case, the projector 1 projects an image (FIG. 1: image 3) in which the trapezoidal distortion is not corrected. The imaging unit 115 images the distorted image 3 projected to the screen 2. The CPU 101 calculates the coordinates (coordinates of the liquid crystal panel 113) of four apexes of the image in which the distortion is corrected based on the image imaged by the imaging unit 115. FIG. 4B shows a state in which the image with the distortion corrected is displayed on the liquid crystal panel 113. The CPU 101 writes the data indicating the calculated coordinates in the RAM 103.

Refer to FIG. 3 again. In Step S3, the CPU 101 calculates the coordinate transform coefficient. The coordinate transform coefficient is a parameter specifying a transform from the image displayed on the liquid crystal panel 113 (for example, FIG. 4B) to the image stored as data in the frame buffer 1032a (for example, FIG. 4A) (hereinafter, referred to as a "coordinate transform" (an example of a coordinate transform process)). The coordinates of the pixels of the main image corresponding to a given pixels of the image after the correction is acquired by performing the coordinate transform to the image after the correction. The coordinate transform is specified by eight coordinate transform coefficients of A to H. The CPU 101 calculates the coordinate transform coefficients A to H by solving the linear simultaneous equation with eight variables of the following equation (1). The CPU 101 writes the data indicating the calculated coordinate transform coefficients A to H in the RAM 103.

$$\begin{pmatrix} X_0 & Y_0 & 1 & 0 & 0 & 0 & -x_0X_0 & -x_0Y_0 \\ 0 & 0 & 0 & X_0 & Y_0 & 1 & -y_0X_0 & -y_0Y_0 \\ X_1 & Y_1 & 1 & 0 & 0 & 0 & -x_1X_1 & -x_1Y_1 \\ 0 & 0 & 0 & X_1 & Y_1 & 1 & -y_1X_1 & -y_1Y_1 \\ X_2 & Y_2 & 1 & 0 & 0 & 0 & -x_2X_2 & -x_2Y_2 \\ 0 & 0 & 0 & X_2 & Y_2 & 1 & -y_2X_2 & -y_2Y_2 \\ X_3 & Y_3 & 1 & 0 & 0 & 0 & -x_3X_3 & -x_3Y_3 \\ 0 & 0 & 0 & X_3 & Y_3 & 1 & -y_3X_3 & -y_3Y_3 \end{pmatrix} \begin{pmatrix} A \\ B \\ C \\ D \\ E \\ F \\ G \\ H \end{pmatrix} = \begin{pmatrix} x_0 \\ y_0 \\ x_1 \\ y_1 \\ x_2 \\ y_2 \\ x_3 \\ y_3 \end{pmatrix} \quad (1)$$

In Step S4, the CPU 101 calculates an inverse coordinate transform coefficient. The inverse coordinate transform coefficient is a parameter specifying a transform from the image stored as data (for example, FIG. 4A) to the image reflected to the screen 2 (for example, FIG. 4B) (hereinafter, referred to as a "inverse coordinate transform"). The inverse coordinate transform is specified by eight coordinate transform coefficients of a to h. The CPU 101 calculates inverse coordinate transform coefficient a to h using the coordinate transform coefficients A to H acquired in advance and the following equation (2).

$a=E-FH$ $b=B-CH$ $c=BF-CE$ $d=FG-D$ $e=-CG+A$ $f=-AF+CD$ $g=DH-EG$ $h=-AH+BG$ (2)

In Step S5, the CPU 101 selects one reference point from the plurality of reference points. For example, the identification numbers are allocated to the plurality of reference points. The CPU 101 selects the reference point from the small identification number in sequence. In Step S6, the CPU 101 performs the inverse coordinate transform with respect to the selected reference point and the pixel adjacent to the reference point (hereinafter, referred to as a "adjacent pixel"). Specifically, the CPU 101 performs the inverse coordinate transform with respect to coordinate (xi, yi) of the OSD image before the correction and calculates coordinate (Xi, Yi) after the correction using the inverse coordinate transform coefficients a to h and the following equation (3).

$$Xi = \frac{axi + byi + c}{gxi + hyi + 1} \quad (3)$$

$$Yi = \frac{dxi + eyi + f}{gxi + hyi + 1}$$

Figure 5A:
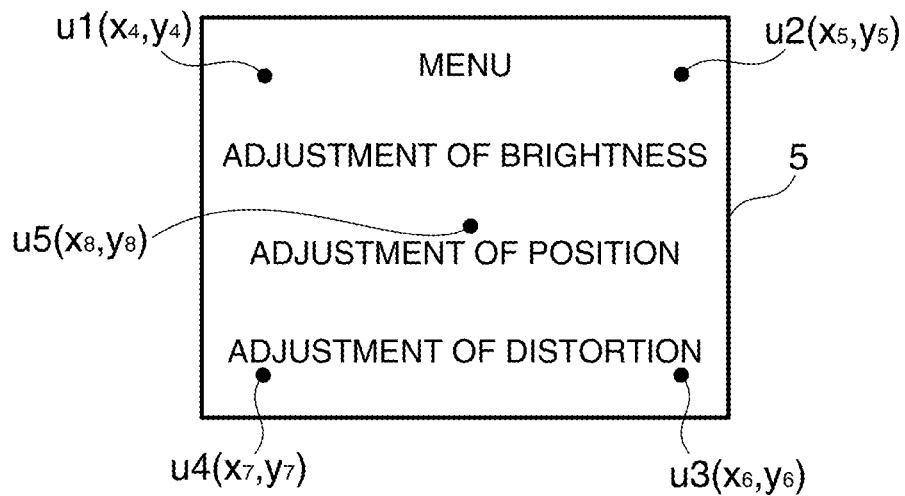
FIGS. 5A and 5B are diagrams showing reference points.
Figure 5B:
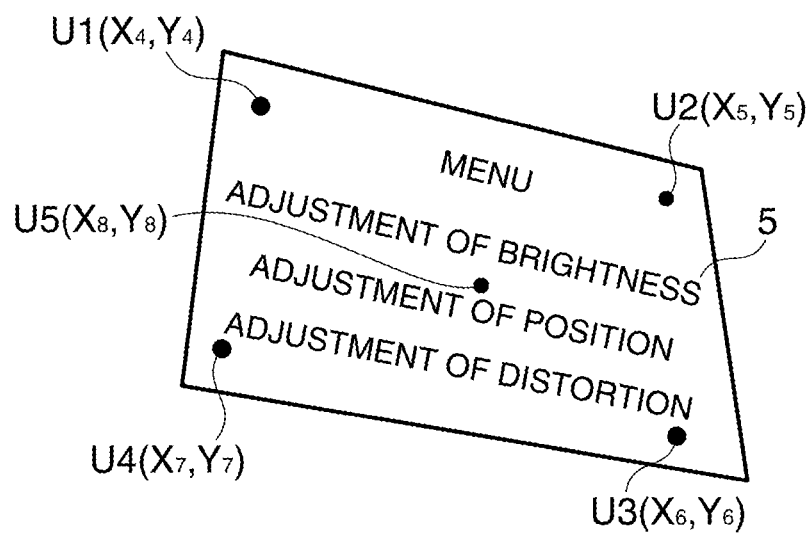

FIGS. 5A and 5B are diagrams showing reference points. FIG. 5A shows reference points u1 to u5 of the OSD image 5 of the image before the correction. The reference point u5 is located in the center of the OSD image 5. The reference points u1 to u4 are located on the predetermined positions of upper left, upper right, lower right, and lower left, respectively, when seen from the center of the OSD image 5. FIG. 5B shows reference points U1 to U5 of the OSD image 5 of the image after the correction.

Refer to FIG. 3 again. In Step S7, the CPU 101 calculates the deformation ratio of the reference points. In this example, a representing value of the plurality of deformation ratios calculated from the relationship of the plurality of adjacent pixels is calculated as the deformation ratio of the reference point. In this example, the minimum value is used as the representing value of the plurality of deformation ratios. The deformation ratio between the pixel of the reference point and one adjacent pixel is a ratio of a distance D after the inverse coordinate transform to a distance d before the inverse coordinate transform of these two pixels. Here, Euclidean distance is used as the distance between the two points.

Figure 6A:
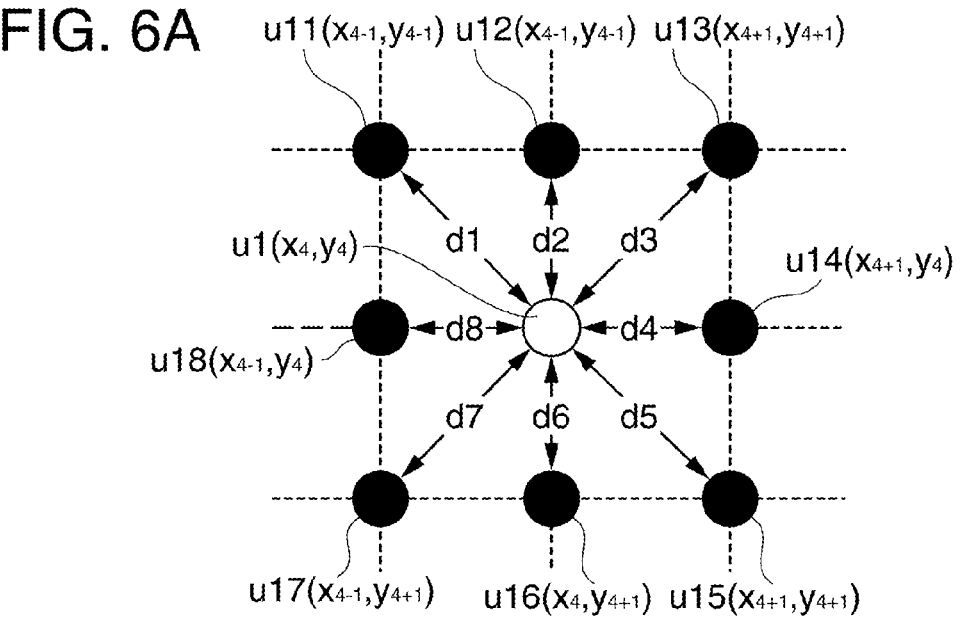
FIGS. 6A and 6B are diagrams showing reference points and adjacent pixels.
Figure 6B:
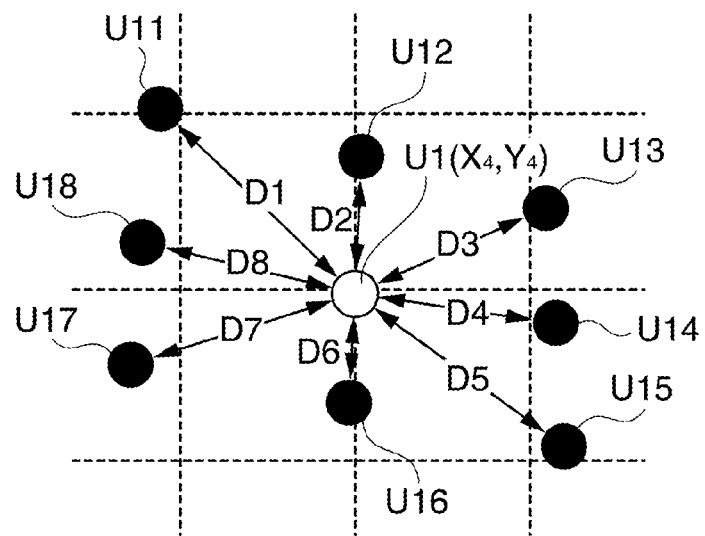

FIGS. 6A and 6B are diagrams showing reference points and adjacent pixels before and after the inverse coordinate transform. In FIGS. 6A and 6B, white circles indicate pixels of the reference points and black circles indicate adjacent pixels respectively. In this example, eight pixels on the upper, the lower, the left, the right, the upper left, the upper right, the lower right, and the lower left sides of the pixel of the reference point are considered as the adjacent pixels. FIG. 6A shows a position relationship between the reference point and the adjacent pixels before the inverse coordinate transform. The dashed line shows a row and a column of the pixels. The pixels are positioned on the intersection of the dashed line of the row and the dashed line of the column. FIG. 6B shows a position relationship between the reference points and the adjacent pixels after the inverse coordinate transform. The dashed line shows the row and column of the pixels before the inverse coordinate transform. In the example of the FIGS. 6A and 6B, by performing the inverse coordinate transform, a distance between an adjacent pixel U12 and a reference point U1 (D2), distance between an adjacent pixel U13 and the reference point U1 (D3) and a distance between an adjacent pixel U16 and the reference point U1 (D6) become shorter than those (d2; d3; d6;) before the inverse coordinate transform. And, a distance between an adjacent pixel U11 and the reference point U1 (D1), a distance of an adjacent pixel U14 and the reference point U1 (D4), a distance between an adjacent pixel U15 and the reference point U1 (D5), a distance between an adjacent pixel U17 and the reference point U1 (D7) and a distance between an adjacent pixel U18 and the reference point U1 (D8) become longer than those (d1; d4; d5; d7; d8;) before the inverse coordinate transform. Hereinafter, a distance between a reference point ui and an adjacent pixel uij is represented as a distance dj, and a distance between a reference point Ui and an adjacent pixel Uij is represented as a distance Dj. The CPU 101 calculates a deformation ratio αi with respect to the reference point ui. In this example, as shown in the following equation (4), the minimum value of the plurality of deformation ratios is calculated as the deformation ratio αi of the reference point ui.

$$\alpha i = \min(Dj/dj) \quad (4)$$

Figure 7:
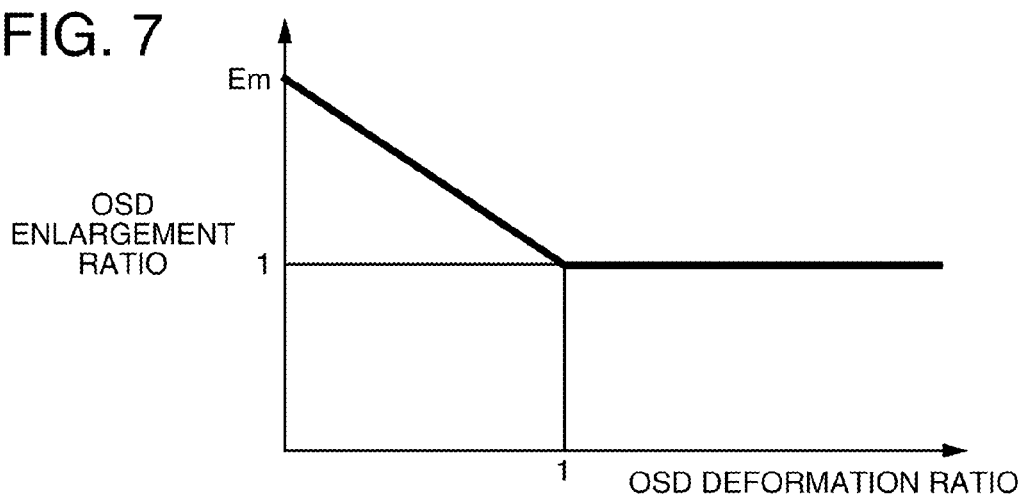
FIG. 7 is a diagram showing a function determining an OSD enlargement ratio.

In the example of FIG. 7, the deformation ratio of the relationship between the adjacent pixel U16 and the reference point is employed as the deformation ratio of the reference point u1.

Refer to FIG. 3 again. In Step S8, the CPU 101 discerns whether the deformation ratio in relation to all of reference points is calculated. When it is discerned that the deformation ratio in relation to all of the reference points is not calculated (Step S8: NO), the CPU 101 proceeds the process to Step S5. When it is discerned that the deformation ratio in relation to all of the reference points is calculated (Step S8: YES), the CPU 101 proceeds the process to Step S9. As described above, the CPU 101 repeats the processes from Step S5 to Step S7 until the deformation ratio in relation to all of the reference points is calculated. In the example of the OSD image 5, the deformation ratios of all of reference points u1 to u5 are determined respectively.

In Step S9, the CPU 101 determines the OSD deformation ratio of the OSD image 5. In this example, the representing value of the plurality of deformation ratios calculated from the Step S5 to Step S7 is determined as the OSD deformation ratio. The minimum value is used as the representing value. As the OSD deformation ratio is close to 1, the degree of deformation of the OSD image by the trapezoidal distortion correction is small. As the OSD deformation ratio is close to 0, the part of the OSD image, having large degree of contracting by the trapezoidal distortion correction exists.

In Step S10, the CPU 101 determines the OSD enlargement ratio based on the OSD deformation ratio. The OSD enlargement ratio is a value showing the magnification for enlarging the size of the OSD image. In this example, the ROM 102 stores the function that determines the OSD enlargement ratio with respect to the OSD deformation ratio. The CPU 101 determines the OSD enlargement ratio corresponding to the OSD deformation ratio using the function. The CPU 101 writes the determined OSD enlargement ratio in the RAM 103.

FIG. 7 is a diagram showing a relationship between an OSD deformation ratio and an OSD enlargement ratio, that is, a function determining an OSD enlargement ratio. In the function, in a region where the OSD deformation ratio is equal to or more than 1, the OSD enlargement ratio is constantly 1 irrespective of the OSD deformation ratio. In a region where the OSD deformation ratio is equal to or more than 0 and less than 1, the OSD enlargement ratio is a decreasing function decreasing from the maximum value Em to 1.

Figure 8:
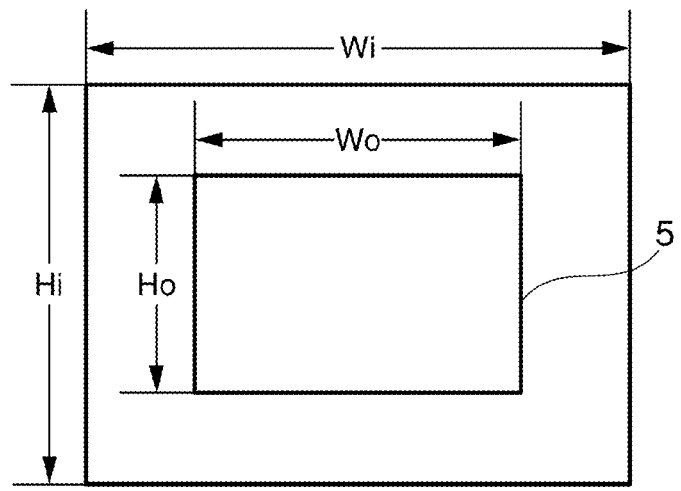
FIG. 8 is a diagram explaining a method of determining a maximum value of an OSD enlargement ratio.

FIG. 8 is a diagram explaining a method of determining a maximum value Em of an OSD enlargement ratio. In a range where the OSD image after the enlargement is not larger than the size of the main image, the maximum value is determined so that the OSD enlargement ratio is maximum. When the width of the OSD image 5 is set as Wo, the height thereof is set as Ho, and the width of the main image is set as Wi, and the height thereof is set as Hi, the maximum value Em is determined by the following equation (5) for example.

$$Em = \min\left(\frac{Wi}{Wo}, \frac{Hi}{Ho}\right) \quad (5)$$

Figure 9:
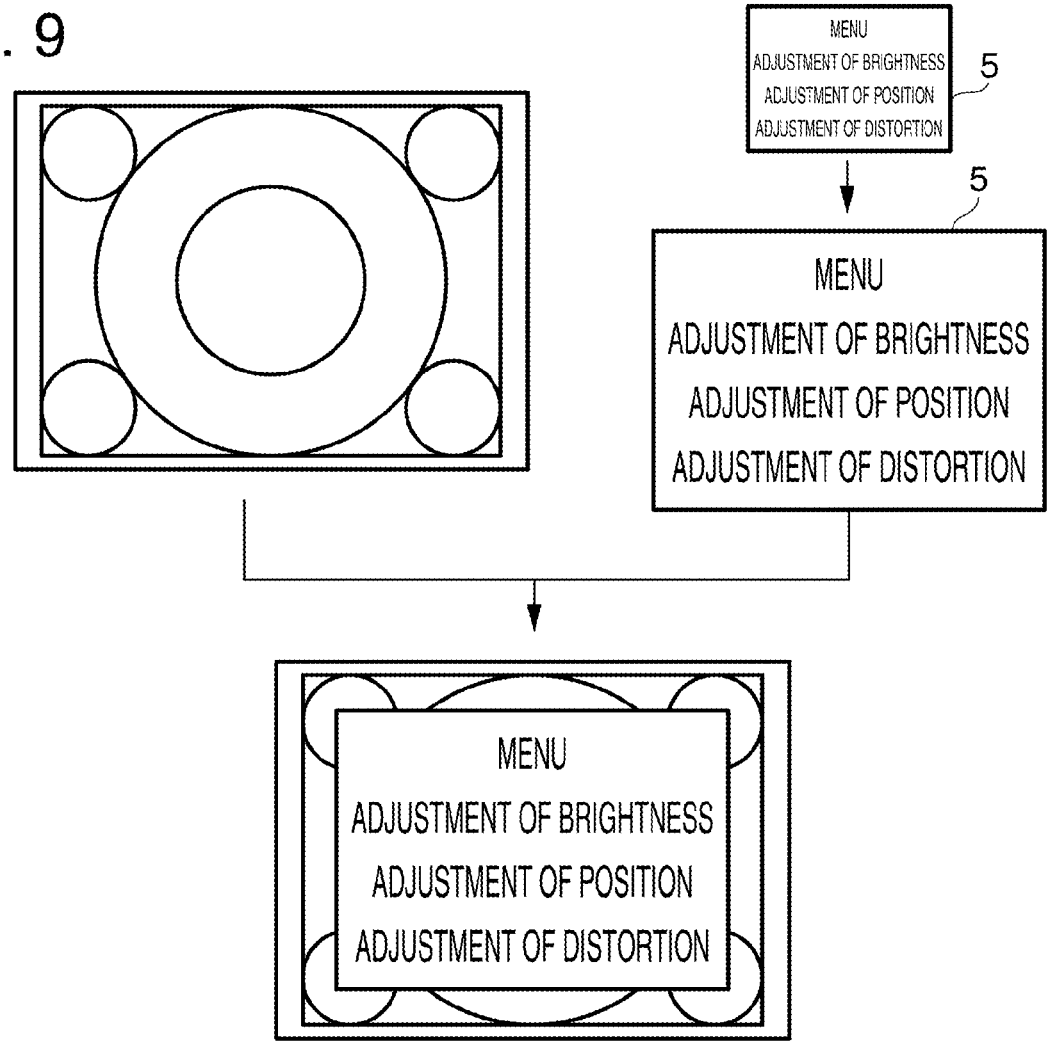
FIG. 9 is a diagram showing an overview of a method of generating synthesis image data.

FIG. 9 is a diagram showing an overview of a method of generating synthesis image. When receiving the OSD imaging command from the CPU 101, the OSD scaler 108 reads out the OSD data and OSD enlargement ratio stored in the RAM 103. The OSD scaler 108 performs an enlargement of the OSD image 5 with the read OSD enlargement ratio. The image synthesis unit 109 synthesizes the main image and the enlarged OSD image 5 and generates the synthesis image data. The information indicating the position relationship between the main image and the OSD image at the time when synthesizing the main image and the OSD image is stored in the ROM 102. For example, the OSD image and the main image are synthesized to have the center thereof in the same position. In another example, the OSD image and the main image may be synthesized so that the reference point of the OSD image (for example, the upper left apex) is positioned at a determined point of the main image.

The trapezoidal distortion correction unit 110 performs a trapezoidal distortion correction with respect to the synthesis image data generated by the image synthesis unit 109. Specifically, the trapezoidal distortion correction unit 110 performs the coordinate transform with respect to the coordinate (Xj, Yj) of the image after the correction and calculates the coordinate (xj, yj) of the synthesis image, using the coordinate transform coefficients A to H and the following equation (6).

$$xj = \frac{AXj + BYj + C}{GXj + HYj + 1} \quad (6)$$

$$yj = \frac{DXj + EYj + F}{GXj + HYj + 1}$$

The trapezoidal distortion correction unit 110 writes a gradation value of the pixel of the coordinate (xj, yj) of the synthesis image in the frame buffer 1032b as the gradation value of the pixel of the coordinate (Xj, Yj) of the image after the correction. In the operation using the equation (6), when the coordinate of the synthesis image is calculated as a decimal number, the corresponding gradation value does not exist. In this case, the trapezoidal distortion correction unit 110 performs the pixel interpolation (convolution operation) disclosed in JP-A-2010-26870 for example, and calculates one gradation value from the gradation values of the coordinates of the synthesis image. The trapezoidal distortion correction unit 110 writes the gradation value calculated by the pixel interpolation in the frame buffer 1032b as the gradation value of the pixel of the coordinate (Xj, Yj) of the image after the correction. The gradation values with respect to the entire pixels of the image after the correction are determined by scanning the X and Y coordinates of the image after the correction.

Figure 10A:
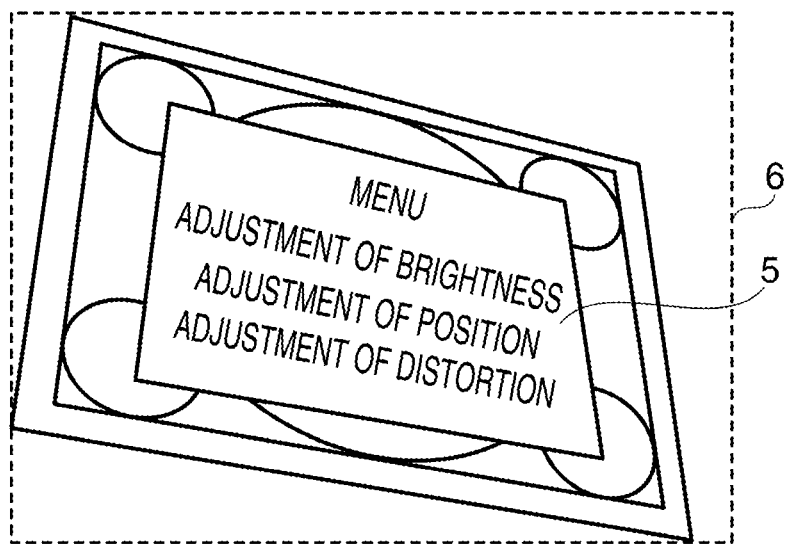
FIGS. 10A and 10B are diagrams comparing between a case in which an OSD enlargement ratio is determined and a case in which an OSD enlargement ratio is not determined.
Figure 10B:
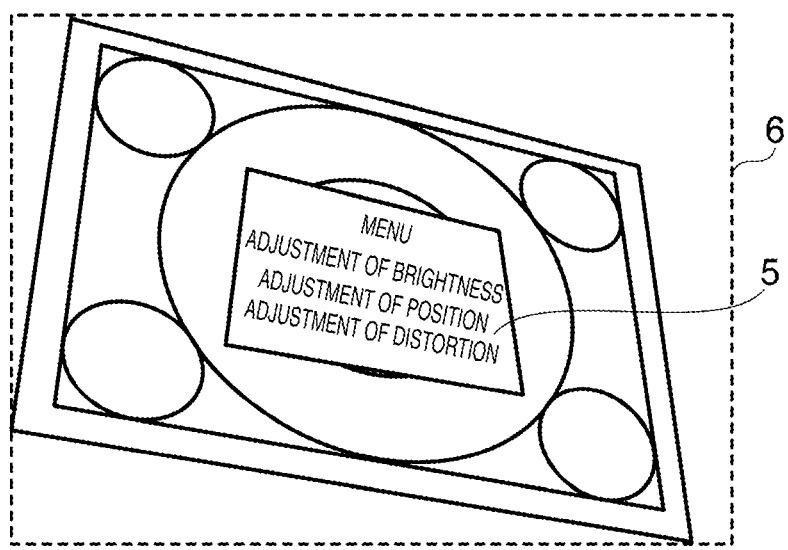

FIGS. 10A and 10B are diagrams comparing between a case in which an OSD enlargement ratio according to OSD deformation ratio is determined and a case in which an OSD enlargement ratio is not determined. As described in the embodiments, FIG. 10A is a diagram showing an image in which the synthesis and the trapezoidal distortion correction are performed by using the OSD enlargement ratio determined in accordance with the OSD deformation ratio. FIG. 10B is a diagram showing an image in which the synthesis and the trapezoidal distortion correction are performed using the constant OSD enlargement ratio (for example, 1) irrespective of the OSD deformation ratio. Since the OSD image 5 in the FIG. 10A becomes larger in size as compared to the OSD image 5 in the FIG. 10B, the visibility of the OSD image is improved.

MODIFICATION EXAMPLE

The embodiments of the invention can be modified in various ways without being limited to the embodiments described above. Hereinafter, several Modification Examples will be described. Two or more may be combined from the Modification Examples which will be described below.

1. Modification Example 1

The positions of the reference points may be anywhere of the OSD image without limiting to the center or four corners of the OSD image. In addition, the distribution of the reference points may be unequal. For example, the reference points may be positioned at a position where the large deformation by the trapezoidal distortion correction is predicted to be generated, and the reference points may be positioned at a position where the smallest letter in the OSD image is displayed. The reference points more than the other region may be positioned at the above positions.

2. Modification Example 2

The projector 1 may store the plurality of OSD data pieces. In this case, one OSD image selected from the plurality of OSD images is used. In this case, the position or the number of the reference points may be set for each of the OSD images. For example, the reference points may be set at a position according to the shapes of the OSD images. The ROM 102 stores the data showing the correspondence relationship between the OSD images and the reference points.

3. Modification Example 3

The OSD deformation ratio is not limited to the ratio calculated using Euclidean distance between the pixel of the reference point and the adjacent pixel. For example, with respect to the reference points and the plurality of adjacent pixels, the representing value of the plurality of deformation ratios calculated with the relationship between a given pixel and a pixel adjacent to the given pixel in the horizontal direction may be calculated as the deformation ratio of the reference point. In this case, the deformation ratio of the given pixel and the pixel adjacent to the given pixel in the horizontal direction is a distance D of the two pixels after the inverse coordinate transform in the horizontal direction (in a case in which the distance between the pixels before the transform is set to 1). For similar example, the representing value of the plurality of deformation ratios calculated with the relationship between a given pixel and a pixel adjacent to the given pixel in the vertical direction may be calculated as the deformation ratio of the reference point. In this case, the deformation ratio of the given pixel and the pixel adjacent to the given pixel in the vertical direction is distance D of the two pixels after the inverse coordinate transform in the vertical direction.

Figure 11A:
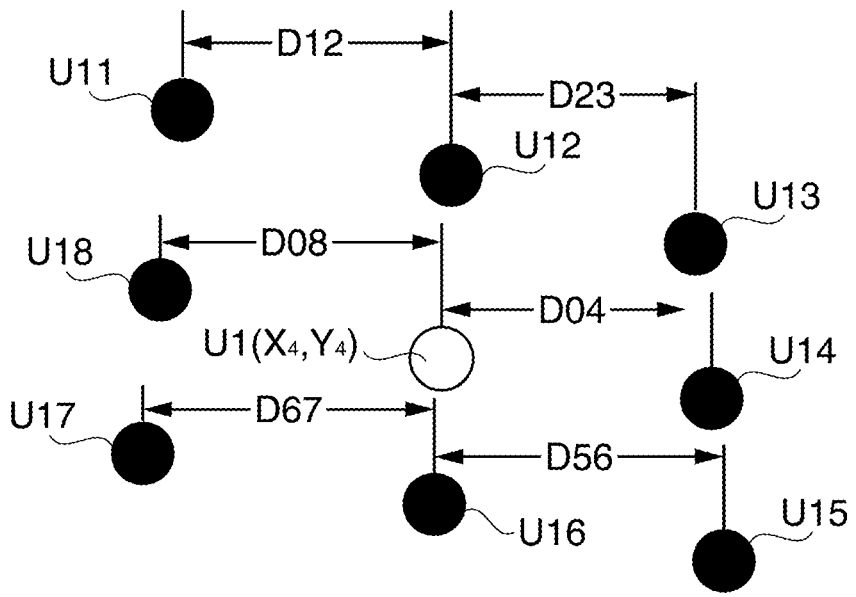
FIGS. 11A and 11B are diagrams showing a method of calculating a deformation ratio.
Figure 11B:
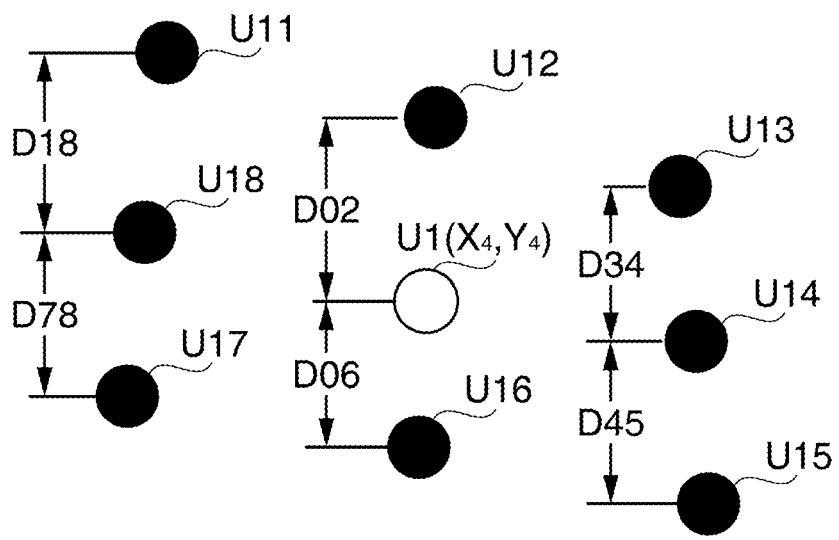

FIGS. 11A and 11B are diagrams showing a method of calculating a deformation ratio according to the Modification Example 3. FIGS. 11A and 11B show a position relationship between the reference points and the adjacent pixels after the inverse coordinate transform. The position relationship between the reference points and the adjacent pixels is the same as shown in FIG. 6B. D12, D23, D08, D04, D67, and D56 shown in FIG. 11A show the plurality of deformation ratios calculated with the relationship between the given pixel and the pixel adjacent to the given pixel in the horizontal direction. In the example shown in FIG. 11A, distances D12 to D56 become longer than before the inverse coordinate transform. In this example, the CPU 101 calculates D23 which is the minimum value among the distances D12 to D56 as the deformation ratio α1, with respect to the reference point u1. D18, D78, D02, D06, D34, and D45 shown in FIG. 11B show the plurality of deformation ratios calculated with the relationship between the given pixel and the pixel adjacent to the given pixel in the vertical direction. In the example, the CPU 101 calculates D06 (and D34, D45 and D78) which is the minimum value among the distances D18 to D45 with respect to the reference point u1 as the deformation ratio α1.

In another example, with respect to the reference points and the plurality of adjacent pixels, the representing value of the plurality of deformation ratios calculated with the relationship between the given pixel and the pixel adjacent to the given pixel in the horizontal direction and the vertical direction may be calculated as the deformation ratio of the reference point. In this case, the minimum value among the plurality of deformation ratios (FIG. 11A) calculated with the relationship with the adjacent pixels in the horizontal direction described above and the plurality of deformation ratios (FIG. 11B) calculated with the relationship with the adjacent pixels in the vertical direction is set as the deformation ratio αi.

4. Modification Example 4

In Step S7, the representing value used in calculating the deformation ratio of the reference point which is a target is not limited to the minimum values among the plurality of deformation ratios. The average value of the plurality of deformation ratios may be used as the representing value. For another example, the deformation ratio which is in the specific number in the order among the plurality of the deformation ratios (for example, second from the bottom) may be used as the representing value. In addition, the representing value to be used may be changed according to the plurality of the deformation ratios. For example, when it is determined as a general rule that the minimum value is used as the representing value, if the minimum value is smaller than the predetermined threshold value, the second deformation ratio from the bottom may be used as the representing value.

5. Modification Example 5

In Step S9, the representing value of the deformation ratios determined as the OSD deformation ratio is not limited to the minimum value. The average value of the deformation ratio of the reference point or the deformation ratio which is in the specific number in the order of the reference point (for example, second from the bottom) may be set as the representing value. Further, as similar to the Modification Example of the case in which the deformation ratio of the reference point is calculated (Modification Example 4), the representing value to be used may be changed according to the plurality of the deformation ratios.

6. Modification Example 6

The pixel used in calculating the deformation ratios is not limited to the adjacent pixel of the reference point. For example, the plurality of deformation ratios may be calculated with the relationship with the pixels in the specific distance (for example, distance for five pixels) from the reference point.

7. Modification Example 7

The process of calculating the parameter of the corrected image in the Step S2 is not limited to the process using the image captured by the imaging unit 115. The CPU 101 may calculate the parameter of the corrected image using the inclination of the projection axis from the ideal state. In this case, the projector 1 includes an inclination sensor (acceleration sensor). The CPU 101 calculates the coordinates (FIG. 4B) of four apexes of the image after the correction from the inclination of the projection axis detected by the inclination sensor from the ideal state.

8. Other Modification Examples

The hardware configuration of the projector 1 is not limited to that described in FIG. 2. The projector 1 may have any kind of hardware configuration as long as the processes of the flow and steps described in FIG. 3 can be executed.

The first image is not limited to the OSD image, and may be the image which is synthesized with the second image and projected. For example, the first image may be the image playing a supporting role for the second image.

The projector 1 performs the trapezoidal distortion correction; however, the "correction process" is not limited to the trapezoidal distortion correction. The "correction process" may be any process executing the deformation of the synthesis image data.

The function determining the OSD enlargement ratio is not limited to that described in FIG. 7. In the region where the OSD deformation ratio is equal to or more than 0 and less than 1, the OSD enlargement ratio may not be linear with respect to the OSD deformation ratio.

The projector according to some embodiments not being limited to using a liquid crystal panel as the optical modulator, it is also acceptable that it is a projector using a digital mirror device.

What is claimed is:

1. A projector comprising:
an OSD deformation ratio calculating unit that calculates an OSD deformation ratio on a reference point which is set in an OSD image superimposed on a main image, when performing a correction of a trapezoidal distortion with respect to OSD data for the OSD image;
an OSD enlargement ratio determination unit that determines an OSD enlargement ratio of the OSD image for changing a size of the OSD image based on the calculated OSD deformation ratio;
an image synthesis unit that generates synthesis image data for a synthesis image which is generated by synthesizing the main image and the OSD image superimposed on the main image with a size of the OSD image determined based on the OSD enlargement ratio;
a trapezoidal distortion correction unit that corrects the trapezoidal distortion with respect to the synthesis image data; and
a projection optical system that projects the synthesis image based on the synthesis image data which is subjected to the correction of the trapezoidal distortion,
wherein when the calculated OSD deformation ratio indicates the OSD image is contracted by the correction of the trapezoidal distortion, the OSD enlargement ratio determination unit determines the OSD enlargement ratio so as to enlarge the OSD image.

2. The projector according to claim 1,
wherein the OSD deformation ratio represents an amount of correction for the reference point during the correction of the trapezoidal distortion.

3. A projector comprising:
a deformation ratio calculating unit that calculates a first deformation ratio on a reference point which is set in a first image which is superimposed on a second image, when performing a correction process with respect to a first image data indicating the first image;
a deformation ratio determination unit that determines a second deformation ratio of the first image for changing a size of the first image based on the first deformation ratio calculated by the deformation ratio calculation unit;
a synthesis image generation unit that generates synthesis image data indicating a synthesis image which is generated by synthesizing the second image indicated by second image data and the first image with a size of the first image determined based on the determined second deformation ratio;
a correction unit that performs a correction process with respect to the generated synthesis image data; and
a projection unit that projects the synthesis image based on the synthesis image data which is subjected to the correction process,
wherein when the calculated first deformation ratio indicates the first image is contracted by the correction process, the deformation ratio determination unit determines the second deformation ratio so as to enlarge the first image.

4. The projector according to claim 3, wherein
the correction process includes a coordinate transform process using a coordinate transform coefficient,
the projector includes a transform coefficient acquirement unit that acquires the coordinate transform coefficient, and
the deformation ratio calculating unit calculates the first deformation ratio based on the coordinate transform coefficient acquired by the transform coefficient acquirement unit.

5. The projector according to claim 3, wherein
a plurality of reference points are set in the first image,
the deformation ratio calculating unit calculates the first deformation ratio on the plurality of reference points, and
the deformation ratio determination unit determines the second deformation ratio based on a representing value of the first deformation ratio calculated on the plurality of reference points.

6. The projector according to claim 3, wherein
a memory unit stores a plurality of first image data pieces, and
the reference point is set in each of the first images.

7. The projector according to claim 4,
wherein the first image is an OSD (On Screen Display) image.

8. A method of controlling a projector comprising:

calculating a first deformation ratio on a reference point which is set in a first image which is superimposed on a second image when performing a correction process with respect to a first image data indicating the first image;

determining a second deformation ratio of the first image for changing a size the first image based on the first deformation ratio;

generating synthesis image data indicating a synthesis image which is generated by synthesizing the second image indicated by second image data and the first image with a size of the first image determined based on the second deformation ratio; and performing the correction process with respect to the synthesis image data, wherein when the calculated first deformation ratio indicates the first image is contracted by the correction process, the second deformation ratio is determined so as to enlarge the first image.

* * * * *